United States Patent [19]
DiGiovanni et al.

[11] Patent Number: 5,703,978
[45] Date of Patent: Dec. 30, 1997

[54] TEMPERATURE INSENSITIVE LONG-PERIOD FIBER GRATING DEVICES

[75] Inventors: David John DiGiovanni, Montclair; Justin Boyd Judkins, Berkeley Heights; Janet Renee Pedrazzani, Summit; Ashish Madhukar Vengsarkar, Chatham; Kenneth Lee Walker, New Providence, all of N.J.

[73] Assignee: Lucent Technologies Inc., Murray Hill, N.J.

[21] Appl. No.: 695,180

[22] Filed: Aug. 1, 1996

Related U.S. Application Data

[63] Continuation of Ser. No. 539,473, Oct. 4, 1995, abandoned.
[51] Int. Cl.[6] .................. G02B 6/34; H01S 3/30; H04J 14/02
[52] U.S. Cl. .................. 385/37; 385/24; 385/31; 385/123; 385/141; 372/6; 359/130; 359/341
[58] Field of Search .................. 385/14, 15, 24, 385/31, 37, 38, 123, 126, 141, 142, 144, 12; 372/6; 359/333, 341, 342, 343, 345, 130, 134

[56] References Cited

U.S. PATENT DOCUMENTS

| | | |
|---|---|---|
| 4,780,877 | 10/1988 | Snitzer ........................... 372/6 |
| 5,016,967 | 5/1991 | Meltz et al. ................. 385/37 X |
| 5,042,897 | 8/1991 | Meltz et al. ...................... 385/37 |
| 5,042,898 | 8/1991 | Morey et al. ..................... 385/37 |
| 5,048,913 | 9/1991 | Glenn et al. ...................... 385/37 |
| 5,218,655 | 6/1993 | Mizrahi ............................. 385/39 |
| 5,317,576 | 5/1994 | Leonberger et al. ............. 372/6 |
| 5,400,422 | 3/1995 | Askins et al. .................... 385/37 |
| 5,430,817 | 7/1995 | Vengsarkar ....................... 385/37 |
| 5,457,760 | 10/1995 | Mizrahi ............................ 385/37 |
| 5,475,780 | 12/1995 | Mizrahi ............................ 385/37 |
| 5,485,481 | 1/1996 | Ventrudo et al. ................. 372/6 |

OTHER PUBLICATIONS

S. Kawakami et al. "Characteristics of a Doubly Clad Optical Fiber with a Low–Index Inner Cladding" *IEEE Journal of Quantum Electronics*, vol. QE–10, No. 12, pp. 879–887 Dec. 1974.

*Primary Examiner*—Brian Healy
*Attorney, Agent, or Firm*—Glen E. Books; Eugen E. Pacher

[57] ABSTRACT

Applicants have determined that the temperature sensitivity of long-period grating devices is due to differential variation with temperature of the refractive indices of the core and cladding. They have further determined that the cladding profile and fiber composition can be redesigned to substantially reduce this differential variation, thereby reducing the temperature sensitivity of long-period gratings of less than 4 nm per 100° C. and preferably less than 2 nm per 100° C. This design permits the use of long-period grating devices without temperature control or compensation.

11 Claims, 5 Drawing Sheets

TEMPERATURE INSENSITIVE LONG-PERIOD FIBER GRATING DEVICES

This application is a continuation of application Ser No. 08/539,473, filed on Oct. 4, 1995, now abandoned.

FIELD OF THE INVENTION

This invention relates to long-period grating devices and, in particular, to such devices having enhanced stability to variations in temperature.

BACKGROUND OF THE INVENTION

Long-period fiber grating devices are potentially useful in a variety of optical communications applications. Such devices typically comprise a length of optical fiber wherein a long-period grating comprising a plurality of refractive index perturbations spaced along the fiber by a periodic distance $\Lambda$. In general, long-period grating devices are those in which the period is at least 10 times larger than the wavelength of input light. Typically $\Lambda$ is in the range 15-1500 μm, and the width w of a perturbation is in the range ⅕ $\Lambda$ to ⅘ $\Lambda$.

In contrast with conventional short period gratings which reflect light, these long-period devices remove light without reflection by converting it from a guided mode to a non-guided mode. The spacing $\Lambda$ of the perturbations is chosen to shift transmitted light in the region of a selected wavelength $\lambda p$ from a guided mode into a non-guided mode, thereby reducing in intensity a band of light centered about $\lambda p$.

Long-period grating devices are thus useful as spectral shaping devices providing, for example, the capability of flattening the spectral gain dependence of an erbium-doped fiber amplifier. See U.S. Pat. No. 5,430,817 issued to A. M. Vengsarkar on Jul. 4, 1995 which is incorporated herein by reference. They can also be used as optical tapping filters.

While these devices provide an elegant solution to the problem of gain flattening, they exhibit temperature sensitivity. The peak wavelength $\lambda p$ shifts by 4–10 nm per 100° C. change in temperature. For some applications where ambient temperatures can fluctuate between 5° and 45° C., such variation is not acceptable, and the devices are placed in temperature compensating packages or temperature controllers for stable operation. Such packaging is expensive and adds reliability problems. Accordingly, there is a need for long-period grating devices having enhanced temperature stability.

SUMMARY OF THE INVENTION

Applicants have determined that the temperature sensitivity of long-period grating devices is due to differential variation with temperature of the refractive indices of the core and cladding. They have further determined that the cladding profile and fiber composition can be redesigned to substantially reduce this differential variation, thereby reducing the temperature sensitivity to long-period gratings of less than 4 nm per 100° C. and preferably less than 2 nm per 100° C. This design permits the use of long-period grating devices without temperature control or compensation.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, are not to scale.

DETAILED DESCRIPTION

Figure 1:
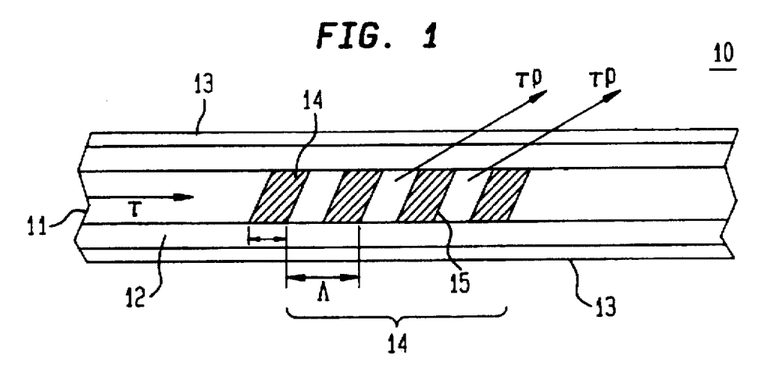
FIG. 1 is a schematic view of a long-period grating in accordance with one embodiment of the invention.

Referring to the drawings, FIG. 1 is a schematic cross section of a long-period grating device having enhanced temperature stability. The device comprises a length of optical fiber 10 for transmitting light in a guided mode having a core 11 surrounded by a composite cladding comprising a low index portion 12 and a higher index portion 13. Both portions of the cladding 12,13 have indices of refraction lower than the index of core 11.

Figure 2:
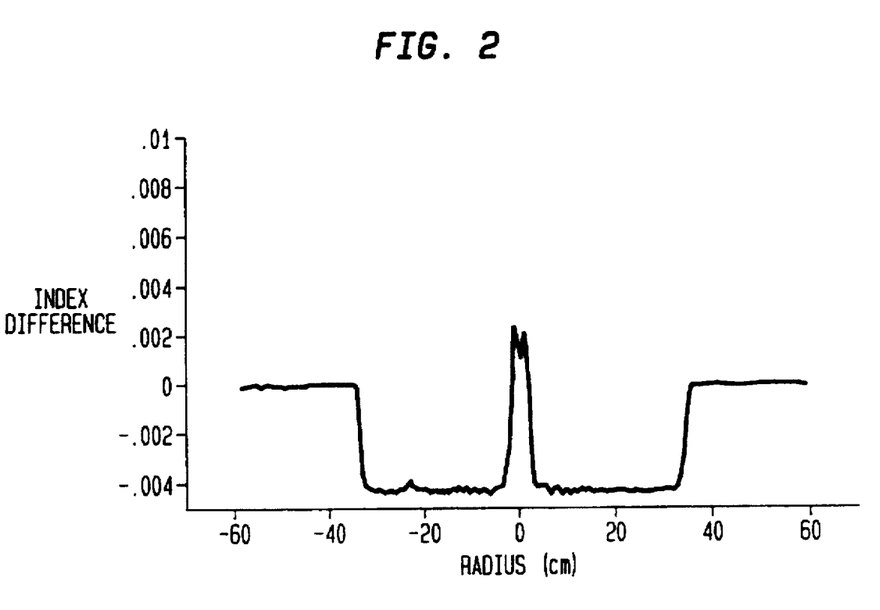
FIG. 2 is a graphical illustration of the index profile of an exemplary optical fiber suitable for making a long-period device of the type shown in FIG. 1.

In order to enhance temperature stability, the composition of cladding portions 12 and 13 are chosen to provide a composite cladding whose average variation of index with temperature in a range of interest (typically 5°–45° C.) is substantially the same as the variation of the core index with temperature over the same range. A preferred materials system is germanium-doped silica for the core 11, fluorine-doped silica for the low index portion of the cladding 12, and undoped silica for the higher index portion 13. FIG. 2, which is a plot of refractive index versus distance from the core center for an exemplary fiber, shows exemplary dimensions and refractive index profile for this application.

The core 11 includes one or more long-period gratings 14, each comprising a plurality of index perturbations 15 of width w spaced apart by a periodic distance $\Lambda$ where, typically, 15 μm$\leq\Lambda\leq$1500 μm. Advantageously, ⅕ $\Lambda\leq w\leq$⅘ $\Lambda$ and preferably w=½ $\Lambda$. The perturbations are formed within the glass core of the fiber and preferably form an angle $\theta$(2°$\leq\theta\leq$90°) with the longitudinal axis of the fiber. The fiber is designed to transmit broad band light of wavelength centered about $\lambda$.

The spacing $\Lambda$ of the perturbations is chosen to shift transmitted light in the region of a selected wavelength $\lambda p$ from the guided mode into a non-guided mode, thereby reducing in intensity a band of light centered about $\lambda p$. A non-guided mode is a mode which is not propagated coherently in the core, and is typically a cladding mode, a radiation mode, or, in the case of multilayer profiles, a ring mode.

Figure 3:
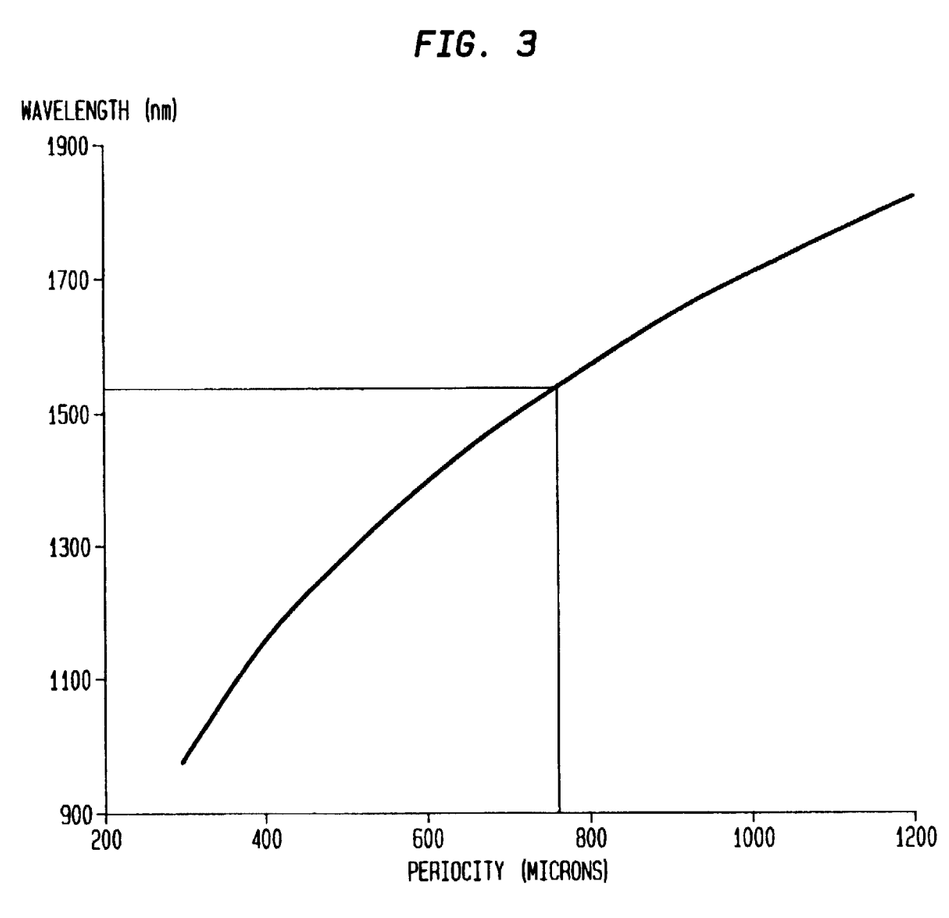
FIG. 3 is a graphical plot of center wavelength $\lambda p$ versus period $\Lambda$ useful in making the device of FIG. 1.

FIG. 3 is a graph illustrating for the fiber of FIG. 2 the periodic spacing $\Lambda$ for removing light centered about a wavelength $\lambda p$. Thus, to make a device for removing light centered around $\lambda p$=1540 nm, one chooses a spacing of $\Lambda$=760 μm as shown in FIG. 3.

The long-period grating 14 can be formed by selectively exposing the core to beams of intense light of width w at locations separated by the distance Λ. Preferably, as a preliminary step, the fiber is loaded with molecular hydrogen or deuterium to enhance the photosensitivity of the core. The preferred exposure source is UV radiation from a KrF excimer laser. Proper spacing can be effected by exposing through a slit of width w and then moving the fiber to the next exposure site. Alternatively, the fiber can be exposed to a wide beam from the laser through an amplitude mask providing a plurality of transparent slits at spacing Λ and opening widths w. Preferably the exposure dosage for each slit is on the order of 1000 pulses of >100 mJ/cm² fluence/pulse, and the number of perturbations is in the range 10–100.

Figure 4:
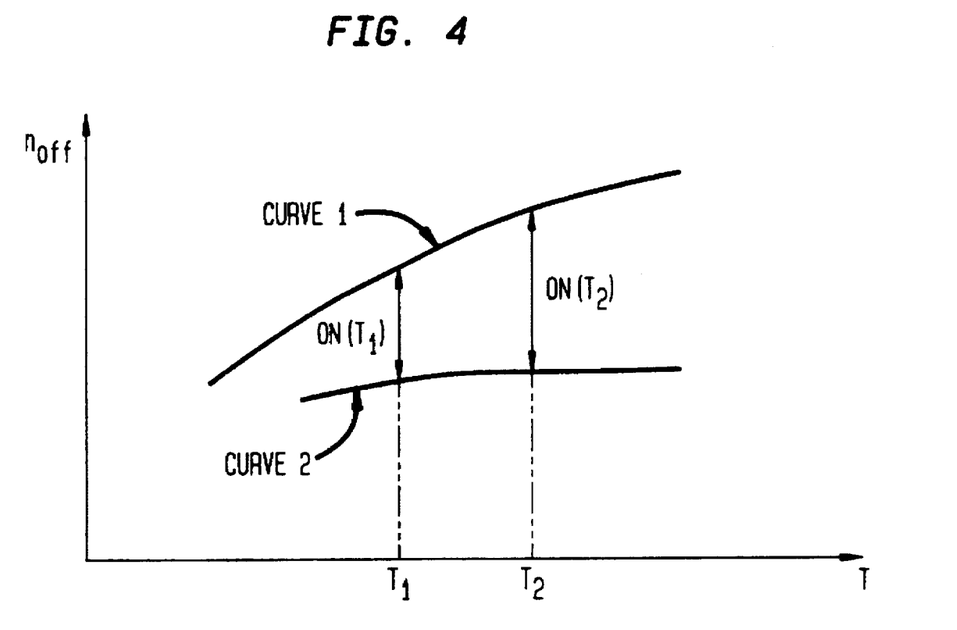
FIGS. 4 and 5 are schematic graphical illustrations showing the temperature variation of refractive indices in conventional and improved long-period gratings, respectively.

The advantage of this device over conventional long-period gratings is enhanced temperature stability. The operational reason for enhanced stability can be seen by consideration of FIGS. 4 and 5. FIG. 4 schematically illustrates the variation of the effective indices of refraction with temperature of the core (curve 1) and cladding (curve 2) of a conventional long-period grating. As can be seen, with increasing temperature, the difference between the two indices, Δn, shifts and thus affects λp.

Figure 5:
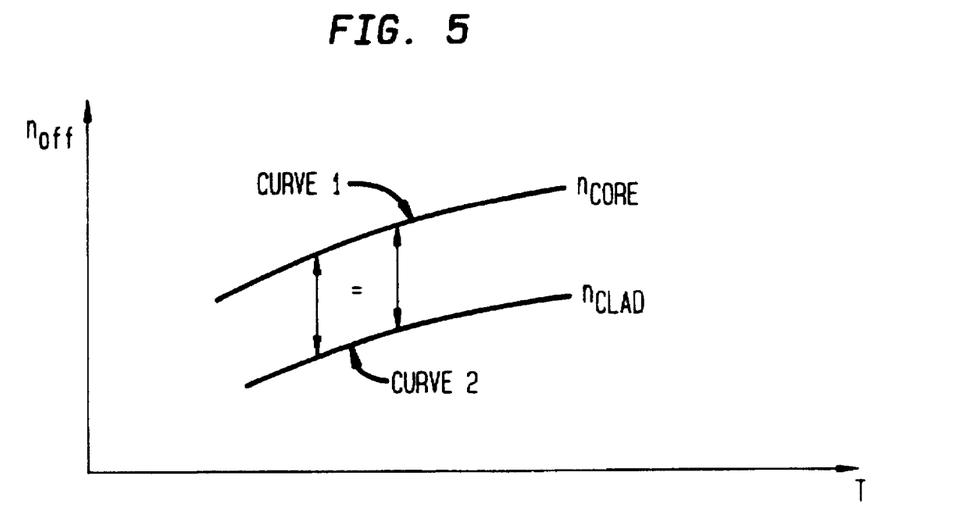

FIG. 5 shows the variation in indices for a long-period device in accordance with FIG. 1. With the average $dn_{eff, cladding}/dT$ substantially equal to the average $dn_{eff, core}/dT$, the core (curve 1) and cladding (curve 2) effective indices vary substantially the same with temperature, reducing the difference Δn. This gives λp enhanced thermal stability.

In contrast with conventional long-period gratings, gratings according to FIG. 1 have been made with shifts of less than 4 nm per 100° C. Using the fiber illustrated in FIG. 2, three gratings were written for three different values of λp and tested for temperature stability with the following results:

| Grating | λp(nm) | ΔT(°C.) | Δλ(nm) | $\frac{d\lambda}{dT}\left(\frac{nm}{100°\,C.}\right)$ |
|---|---|---|---|---|
| 1 | 1396.4 | 113 | 1 | 0.89 |
| 2 | 1307.6 | 113 | 0.7 | 0.62 |
| 3 | 1235.0 | 113 | 0.8 | 0.71 |

Figure 6:
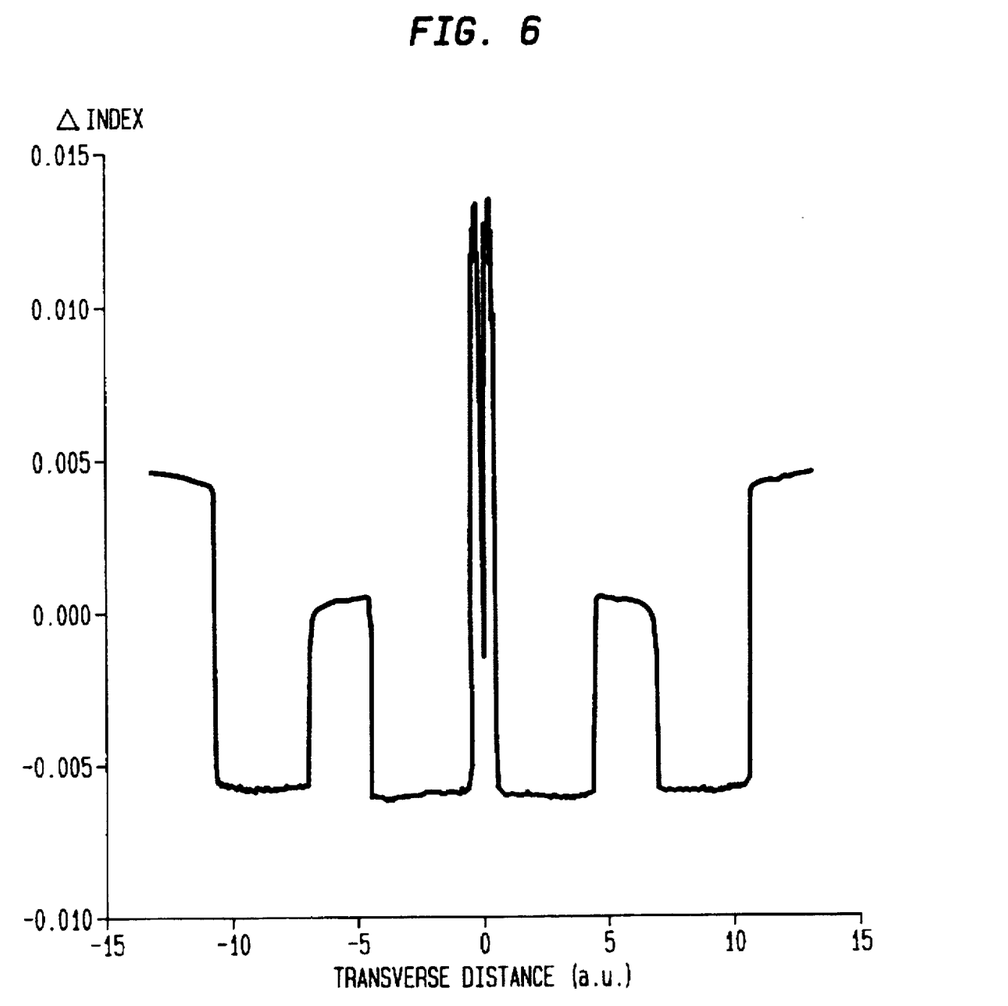
FIG. 6 illustrates the index profile of an alternative fiber for making a temperature insensitive long-period grating device.

FIG. 6 shows the refractive index profile of an alternative fiber for making a temperature insensitive long-period grating device having a three-layer composite cladding rather than the two-layer cladding of FIG. 2. Here the core (centered at transverse distance =0) can be germanium-doped silica, middle cladding ring (at transverse distance =5) can be phosphorus doped silica forming a relatively high index region (but less than the core) and the inner and outer cladding rings can be relatively low index regions of fluorine-doped silica. These temperature insensitive long-period grating devices are useful as spectral shaping devices.

Figure 7:
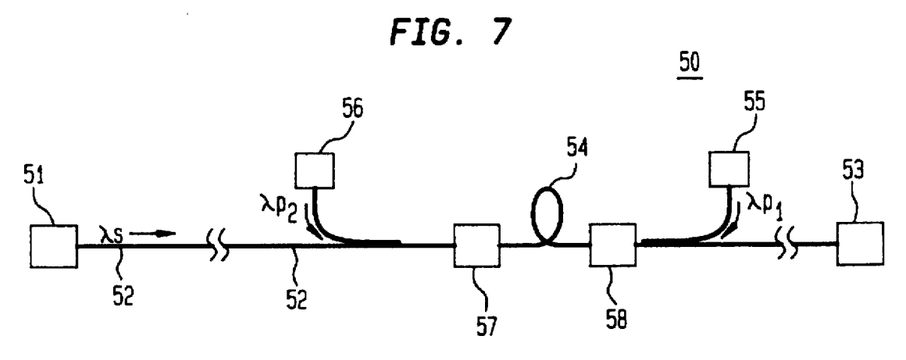
FIG. 7 shows an optical transmission system using a temperature insensitive long-period grating device to remove unused pump energy.

FIG. 7 illustrates an optical transmission system 50 using a temperature insensitive long-period spectral shaping device to remove unused pump energy. Specifically, the system 50 comprises a transmitter source 51 of optical signals such as a digitally modulated 1.55 μm signal, an optical signal path comprising a length of optical fiber 52 for transmitting the signal, and a receiver 53 for receiving and demodulating the signal. An optical amplifier such as an erbium-doped fiber amplifier 54 is disposed in the optical signal path for amplifying the transmitted signal. The amplifier is pumped by pump sources 55, 56 of optical energy of pump wavelengths λp₁ and λp₂. Unused pump energy of each pump wavelength will pass through amplifier 54. The energy is advantageously removed from the system so that it will not deteriorate the performance of the pump sources and transmission and receiving equipment 51, 53. To remove unused pump energy, a long period spectral shaping device 57 is disposed in the path of the energy from pump 55 after it has passed through amplifier 54. Specifically, in the dual-pumped laser of FIG. 6, device 57 has its spacing Λ chosen to remove energy of wavelength λp₁. A second long period grating 58 has its spacing chosen to remove energy of wavelength λp₂. In a typical application, λ, is 1.55 μm, λp₁ is 0.978 μm and λp₂ is 0.98 μm. Thus, for example, device 57 could comprise a hydrogen-loaded germanosilicate fiber with core index and diameter chosen such that it allows the propagation of only the fundamental mode at λ≧0.97 μm. For this application the perturbations should be exposed by a dosage ≧100 mJ/cm² and there should be at least 20 perturbations in each grating.

Another preferred use of the device of FIG. 1 is to reduce spectral dependence in the gain output of a rare-earth doped optical fiber amplifier. The characteristic gain spectrum of an erbium-doped optical fiber amplifier, for example, has a pair of gain peaks at about 1.53 μm and at about 1.56 μm. So a signal at 1.53 μm will be amplified more than one at 1.54 μm, which would be disadvantageous in a WDM system.

Figure 8:
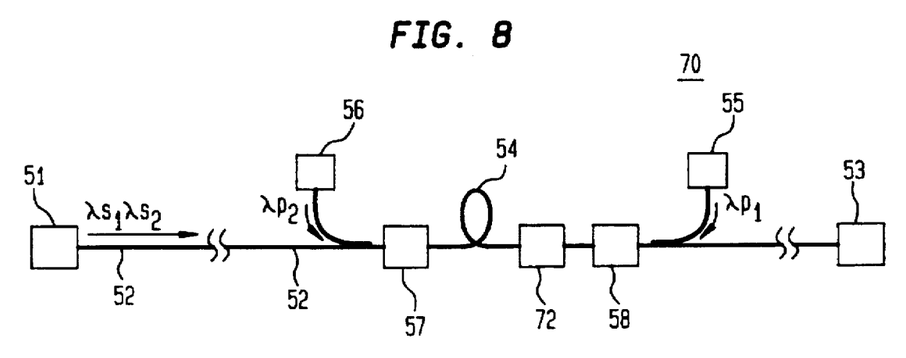
FIG. 8 shows an optical transmission system using a long-period grating device to flatten the gain of an optical amplifier.

FIG. 8 illustrates an optical transmission system 70 using a temperature insensitive long-period shaping device 72 to shape the spectral gain characteristics of a rare-earth doped optical fiber amplifier. Specifically it is here used to reduce the spectral dependence of an erbium-doped fiber amplifier 54. The device 72 is disposed in the path of the amplifier 45. The shaping device 72 has one set of spacings Λ chosen to remove energy of wavelength 1.53 μm corresponding to the gain peak wavelength of the amplifier and another set of spacings to remove energy of wavelength 1.56 μm at the other gain peak. By proper choice of the number of perturbations and the dosage of exposure, the gain spectrum of the amplifier/device combination can be made substantially flat over a range of wavelengths 1530 to 1560 nm. For a typical erbium amplifier, the shaping device exposed by a dosage ≦100 mJ/cm², 1000 pulses per slit will produce a more uniform gain response over the range of wavelengths 1530–1560 nm.

Advantageously, system 70 can be a WDM system using a plurality of different wavelength signals, e.g. λs₁ and λs₂. It should be understood that the shaping device 72 need only be in the optical path of the amplifier. It can be before, after or within the optical amplifier cavity comprising the rare-earth-doped fiber.

While not necessary to the invention, the following sets forth applicants' best understanding of how the invention works. In a long period dielectric waveguide grating where the grating portion constitutes a small perturbation of the refractive index, the center wavelength is accurately predicted by:

$$n_{eff, core} - n_{eff, cladding} = \frac{\lambda p}{\Lambda}$$

where $n_{eff, core}$ and $n_{eff, cladding}$ are the effective indices of the core and cladding modes and Λ is the periodicity of the grating.

The temperature sensitivity, dλp/dT, of the grating can then be estimated by $$\frac{d\lambda_p}{dT} = \Lambda \left( \frac{d(n_{\text{eff,core}})}{dT} - \frac{d(n_{\text{eff,cladding}})}{dT} \right)$$

An optimal temperature insensitive design is achieved when $$\frac{d(n_{\text{eff,core}})}{dT} = \frac{d(n_{\text{eff,cladding}})}{dT}$$

is enforced at a particular wavelength and choice of cladding mode.

Temperature dependence in dispersion arises from variations in the refractive indices of the dielectrics in the waveguide. This variation can be modified by design of the profile of the waveguide and selection of the temperature coefficients of the dielectric materials. The set of composite cladding designs having a desired center can be found by combining the above constraint with the numerical techniques described in S. Kawakami et al, "Characteristics of a Doubly Clad Optical Fiber With A Low-Index Inner Cladding", *IEEE Journal of Quantum Electronics*, Vol. QE-10, No. 12 (December, 1974), which is incorporated herein by reference.

The remaining portion of this disclosure is directed to those skilled in the art who may wish to extend the invention to structures and wavelengths substantially different from those described above. We describe first the general approach, second the equations used to model the fiber waveguide, third the effects of temperature sensitivity and fourth, the temperature model of the waveguide incorporating the effects.

The General Approach

The general approach can be summarized as follows:

1) Temperature insensitive long-period fiber gratings are designed using a modeling approach.
2) Before the model is developed, all characteristics of the long-period device that are sensitive to temperature are considered.
3) Temperature dependencies are evaluated in terms of their contribution to the overall effect. Then, the most important characteristics are retained, while the rest are discarded.
4) A model is developed to determine the temperature dependence of the center wavelength $\lambda_p$ for a long-period fiber grating filter with a given set of inputs.
5) Using a computer program based on Maxwell's equations and the temperature model, one can derive $$\vec{A} = \Psi^A \hat{u}_z = \begin{cases} A_i J_n(k_p \rho) + B_i N_n(k_p \rho) & k_{p_i}^2 > 0 \\ A_i I_n(k_p \rho) + B_i K_n(k_p \rho) & k_{p_i}^2 > 0 \end{cases}$$

from the index profile and the physical dimensions of a step index fiber profile with a reasonable number of layers.

6) Simulations for a range of variations in the preform design are produced in order to minimize the numerical value of the quantity of interest. This will produce a design with low temperature sensitivity.

2. The Fiber Waveguide Model

The fiber has features that can be approximated by uniform concentric layers. The solutions to the fields in each region are given by Bessel's functions. These functions are used as basis functions. In each layer, a form of the solution to the electric, $\vec{F}$, and magnetic, $\vec{A}$, potentials is assumed.

$$\vec{A} = \Psi^A \hat{u}_z = A_i J_n(k_p \rho) + B_i N_n(k_p \rho) \quad k_{p_i}^2 > 0$$

or $$A_i I_n(k_p \rho) + B_i k_n(k_p \rho) \; k_{p_i}^2 > 0$$

where $A_i$ and $B_i$ are unknown coefficients, $J_n$, $N_n$ and $I_n$, $K_n$ are Bessel functions, and $k_{p_i}^2 = k_i^2 - \beta^2$. $\vec{F} = \Psi^F \hat{u}_z$ has the same form as $\vec{A}$ with $C_i$ and $D_i$ as the unknown coefficients.

Through Maxwell's equations, the fields are expressed in terms of potentials.

$$E_\rho = \frac{-j\beta}{\hat{y}} \frac{d\Psi^A}{d\rho} - \frac{jn}{\rho} \Psi^F$$

$$H_\rho = \frac{-j\beta}{\hat{z}} \frac{d\Psi^F}{d\rho} + \frac{jn}{\rho} \Psi^A$$

$$E_\phi = \frac{n\beta}{\hat{y}\rho} \Psi^A + \frac{d\Psi^F}{d\rho}$$

$$H_\phi = \frac{n\beta}{\hat{z}\rho} \Psi^F - \frac{d\Psi^A}{d\rho}$$

$$E_z = \frac{1}{\hat{y}} (k_i^2 - \beta^2) \Psi^A$$

$$H_z = \frac{1}{\hat{z}} (k_i^2 - \beta^2) \Psi^F$$

The following boundary conditions are applied:
i) fields are finite at the origin
ii) fields are zero at infinity
iii) $E_\phi$, $H_\phi$, $E_z$, $H_z$ are continuous functions across each interface between regions.

This results in a system of equation for $A_i$, $B_i$, $C_i$, and $D_i$ and an unknown eigenvalue $\beta$. This system is represented by a matrix with dimension m by m, where m=(# Layers−½)×4.

The eigenvalue $\beta$ is a root of the determinant of the matrix, $D(\beta)=0$, and it is found using standard root-solving techniques. Each mode is characterized by a different solution for $\beta$.

Once the $\beta$ of each mode is found, the value 1 is assigned to one of the unknowns, in most cases to $A_1$. The matrix is then inverted to find the solution to the rest of the coefficients, relative to $A_1$. All coefficients are then scaled to make the time average power flow $$<S> = \int_{fiber} (\vec{E} \times \vec{H}) \cdot \hat{u}_z \, dS$$

equal to 1 watt.

To keep this method computationally efficient, the maximum number of layers is restricted to 8.

The Effects of Temperature

The center wavelength for a long-period fiber grating filter (i.e. the wavelengths at which the core and a cladding mode are phase matched by the grating) is given by the relation $$n_{core}(\lambda, T) - n_{cladding}(\lambda, T) = \frac{\lambda_p}{\Lambda}.$$

The first term in the temperature sensitivity of the center wavelength is therefore given by $$\frac{d\lambda_p}{dT} = \Lambda \left( \frac{dn_{\text{eff,core}}}{dT} - \frac{dn_{\text{eff,cladding}}}{dT} \right)$$

Experimental observations indicate that temperature dependence is roughly linear for temperatures 0° C. to 100° C.

We assume $$\lambda_p(T) = \frac{d\lambda_p}{dT} T \text{ where } \frac{d\lambda_p}{dT}$$

is constant. We then minimize $$\frac{d\lambda_p}{dT}$$

with fiber design.

For certain modes in a fiber, in some wavelength range, $dn_{\text{eff, core}}/dT$ should be balanced by $dn_{\text{eff, cladding}}/dT$.

Effects in $SiO_2$ due to thermal expansion include $\Delta L/L$ per °C equal to approximately $6 \times 10^{-6}$. For expansion in the axial direction $\Delta\lambda/\lambda = 6 \times 10^{-4}$ per 100° C. At 1500 nm, the temperature dependence for the first effect alone is +0.9 nm/100° C. Uniform expansion in the radial direction gives a similar contribution to both modes since both the core and the cladding modes have the same physical size to wavelength dependence. Therefore, $\Delta L/L$ (radial) $= \Delta\lambda/\lambda$. This effect on ($n_{\text{eff, core}} - n_{\text{eff, cladding}}$) is much smaller.

The Temperature Model

Perturbation theory gives us $$\beta - \beta_o = \omega \frac{\iint_s (\Delta\epsilon \vec{E} \cdot \vec{E}_o^* + \Delta\mu \vec{H} \cdot \vec{H}_o^*) dS}{\iint_s [\vec{E}_o^* \times \vec{H} + \vec{E} \times \vec{H}_o^*] \cdot \hat{u}_z \, dS}$$

where $\beta$ is propagation constant, $\omega$ is radial frequency, $S$ is the cross sectional surface of the fiber, and where $$\beta - \beta_o = \frac{\omega}{c} (n_{\text{eff}} - n_{\text{eff},o}) \text{ and}$$

, $n_{\text{eff}}$ is the effective index of the mode $n_{\text{eff},o}$ is the unperturbed effective index of the mode. This is an exact formula containing both the perturbed fields, $\vec{E}$ and $\vec{H}$, and the transverse fields, $\vec{E}_o$ and $\vec{H}_o$, of the unperturbed waveguides. The perturbation to the waveguide is given by $\Delta\epsilon$ and is a function of temperature.

For small variations in refractive index of bulk glass caused by a change in temperature, $\Delta n = \alpha \Delta T$, we can make the approximation of replacing the solutions to the perturbed fields, $\vec{E}$ and $\vec{H}$, which are unknown, with the solutions to the fields in the unperturbed fiber.

$$\vec{E} \to \vec{E}_o$$
then, $$\Delta n_{\text{eff}} = \frac{\frac{1}{\eta_o} \iint_s \Delta\epsilon_i (\vec{E}_o \cdot \vec{E}_o^*) dS}{2 \iint_s (\vec{E}_o \times \vec{H}_o^*) \cdot \hat{u}_z dS},$$

where $\eta_o$ is impedance of free space.

Assuming the fiber is a layered structure with each layer $i$ having an index $n_i$ and a temperature coefficient $\alpha_i$, then:

i) $\Delta\epsilon_i = 2n_i \Delta n_i = 2n_i \alpha_i \Delta T$ ii) We can normalize the fields, such that the time average power flow $= \iint_s [\vec{E}_o \times \vec{H}_o] \cdot \hat{u}_z \, dS = 1$ watt.

iii) The surface of each layer (i) is $S_i$.

The total temperature dependence is given by the sum of each layers' contribution.

$$\frac{dn_{\text{eff}}}{dT} = \frac{1}{\eta_o} \sum_{i=1}^{N \text{ layers}} \frac{n_i \alpha_i \iint_{S_i} |\vec{E}_o|^2 dS}{\eta_o}$$

This results in a temperature induced shift in wavelength given by $$\frac{d\lambda}{dT} = \Lambda \sum_{i=1}^{N \text{ layers}} \alpha_i (W_i^{\text{core}} - W_i^{\text{cladding}})$$

where $W_i^{\text{core}}$ and $W_i^{\text{cladding}}$ are functions of the core and cladding fields given by $$W_i = \frac{n_i}{\eta_o} \iint_{S_i} |\vec{E}_o|^2 dS$$

The electric field $\vec{E}$ of the mode was calculated by the method of the previous section.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

The invention claimed is:

1. A long-period grating device having enhanced stability to variations in temperature comprising:

an optical fiber including a core having a refractive index and a core guided mode with effective index $n_{\text{eff, core}}$, with a rate of change with respect to temperature $dn_{\text{eff, core}}/dT$;

a cladding surrounding said core having a cladding mode with effective index $n_{\text{eff, cladding}}$, less than $n_{\text{eff, core}}$ and an average rate of change with respect to temperature $dn_{\text{eff, cladding}}/dT$;

wherein said core has a plurality of perturbations in its refractive index spaced apart by a periodic distance $\Lambda$ to form a long-period grating with a center wavelength $\lambda p$;

and wherein $dn_{\text{eff, cladding}}/dT$ is sufficiently close to $dn_{\text{eff, core}}/dT$ that the rate of change of $\lambda p$ with respect to temperature is less than 4 nm/100° C.

2. A device according to claim 1 wherein said cladding is a composite cladding comprising a first portion adjacent to said core with an index of refraction lower than said core and a second portion adjacent said first portion with an index of refraction greater than said first portion.

3. A device according to claim 2 wherein said core is germanium-doped silica, said first portion of cladding is fluorine-doped silica and said second portion of cladding is silica.

4. A device according to claim 2 wherein said composite cladding further comprises a third portion adjacent said second portion, said third portion having an index of refraction lower than said second portion.

5. A device according to claim 4 wherein said core is germanium-doped silica, said first portion of cladding is fluorine-doped silica, said second portion is phosphorous-doped silica, and said third portion is fluorine-doped silica.

6. A device according to claim 1 wherein $dn_{\text{eff, cladding}}/dT$ is sufficiently close to $dn_{\text{eff, core}}/dT$ over the range 0°–100° C. that the rate of change of $\lambda p$ with respect to temperature is less than 2 nm/100° C. over said range.

7. An optical fiber communications system comprising:

a source of an optical signal;

optically coupled to said source, an optical signal path comprising length of optical fiber for transmitting said optical signal;

disposed in said optical signal path, an optical amplifier for amplifying said optical signal;

a pair of pumping sources for pumping said optical amplifier with optical pumping energy of wavelengths $\lambda p_1$ and $\lambda p_2$;

disposed in the path of energy from each pump after said pumping energy has passed through said amplifier unused, a spectral shaping device for removing said unused pumping energy from said optical path comprising a long-period grating device according to claim 1.

8. A communications system according to claim 7 wherein said optical amplifier comprises an erbium-doped optical fiber amplifier.

9. An optical fiber communications system comprising:

a source of at least one optical signal;

optically coupled to said source, an optical signal path comprising a length of optical fiber for transmitting said optical signal;

disposed in said optical signal path, an optical amplifier having a gain spectral dependence with one or more peak regions providing different gain for different wavelengths;

disposed in said optical signal path, a spectral shaping device comprising a long-period grating device according to claim 1 for removing energy from the spectral region of one or more of said peak regions in order to provide a more uniform spectral output.

10. A communications system according to claim 9 wherein said optical amplifier comprises an erbium-doped optical fiber amplifier.

11. An optical fiber amplifier comprising a rare-earth doped length of optical fiber; and a long-period grating device according to claim 1 in the path of said fiber for shaping the spectral gain characteristics of said amplifier.

* * * * *